United States Patent
Campbell

(10) Patent No.: US 11,348,395 B2
(45) Date of Patent: May 31, 2022

(54) PHYSICAL ZONE PACE AUTHENTICATION

(71) Applicant: ASSA ABLOY AB, Stockholm (SE)

(72) Inventor: Donald MacDougal Campbell, San Francisco, CA (US)

(73) Assignee: ASSA ABLOY AB, Stockholm (SE)

(*) Notice: Subject to any disclaimer, the term of this patent is extended or adjusted under 35 U.S.C. 154(b) by 212 days.

(21) Appl. No.: 16/498,602

(22) PCT Filed: Dec. 22, 2017

(86) PCT No.: PCT/IB2017/001705
§ 371 (c)(1),
(2) Date: Sep. 27, 2019

(87) PCT Pub. No.: WO2018/178737
PCT Pub. Date: Oct. 4, 2018

(65) Prior Publication Data
US 2020/0051349 A1 Feb. 13, 2020

Related U.S. Application Data

(60) Provisional application No. 62/478,959, filed on Mar. 30, 2017.

(51) Int. Cl.
*G07C 9/22* (2020.01)
*H04L 9/40* (2022.01)
*G06F 21/00* (2013.01)

(52) U.S. Cl.
CPC ............. *G07C 9/22* (2020.01); *H04L 63/104* (2013.01); *H04L 63/105* (2013.01); *H04L 63/107* (2013.01)

(58) Field of Classification Search
CPC ....... G07C 9/22; H04L 63/104; H04L 63/105; H04L 63/107; G06F 21/30; G06F 21/31; G06F 21/316; G06F 21/32; G06F 21/45
See application file for complete search history.

(56) References Cited

U.S. PATENT DOCUMENTS

| | | | | |
|---|---|---|---|---|
| 2011/0148633 | A1* | 6/2011 | Kohlenberg | G06F 21/30 340/541 |
| 2013/0102283 | A1* | 4/2013 | Lau | H04W 4/02 455/411 |

(Continued)

FOREIGN PATENT DOCUMENTS

WO    WO-2018178737 A1    10/2018

OTHER PUBLICATIONS

"European Application Serial No. 17838065.5, Response to Communication pursuant to Rules 161(1) and 162 EPC filed May 14, 2020", 14 pgs.

(Continued)

*Primary Examiner* — Edward Zee
(74) *Attorney, Agent, or Firm* — Schwegman Lundberg & Woessner, P.A.

(57) ABSTRACT

A method for administering a physical access control system is provided. One example of the disclosed method includes receiving sensor data from one or more sensors deployed in a facility, the sensor data including information describing a user's activity within a zone of the facility or a user's movement between zones of the facility. The method also includes comparing the sensor data to one or more user models that describe a normal or expected user activity within the zone of the facility or user movement between the zones of the facility and based on the comparison of the sensor data to the one or more user models, determining that the user's activity does not fall within the normal or expected user activity within the zone of the facility or user movement between the zones of the facility.

19 Claims, 12 Drawing Sheets

(56) References Cited

U.S. PATENT DOCUMENTS

2014/0215558 A1    7/2014 Hoyos et al.
2015/0310434 A1  10/2015 Cheung
2016/0196728 A1    7/2016 Suman et al.
2016/0217345 A1    7/2016 Appel et al.
2016/0352729 A1  12/2016 Malik

OTHER PUBLICATIONS

"European Application Serial No. 17838065.5, Communication Pursuant to Article 94(3) EPC dated Dec. 11, 2020", 10 pgs.
"International Application Serial No. PCT/IB2017/001705, International Search Report dated May 16, 2018", 6 pgs.
"International Application Serial No. PCT/IB2017/001705, Invitation to Pay Additional Fees and Partial Search Report dated Mar. 21, 2018", 12 pgs.
"International Application Serial No. PCT/IB2017/001705, Written Opinion dated May 16, 2018", 11 pgs.
"European Application Serial No. 17838065.5, Response filed Apr. 20, 2021 to Communication Pursuant to Article 94(3) EPC dated Dec. 11, 2020", 22 pgs.

\* cited by examiner

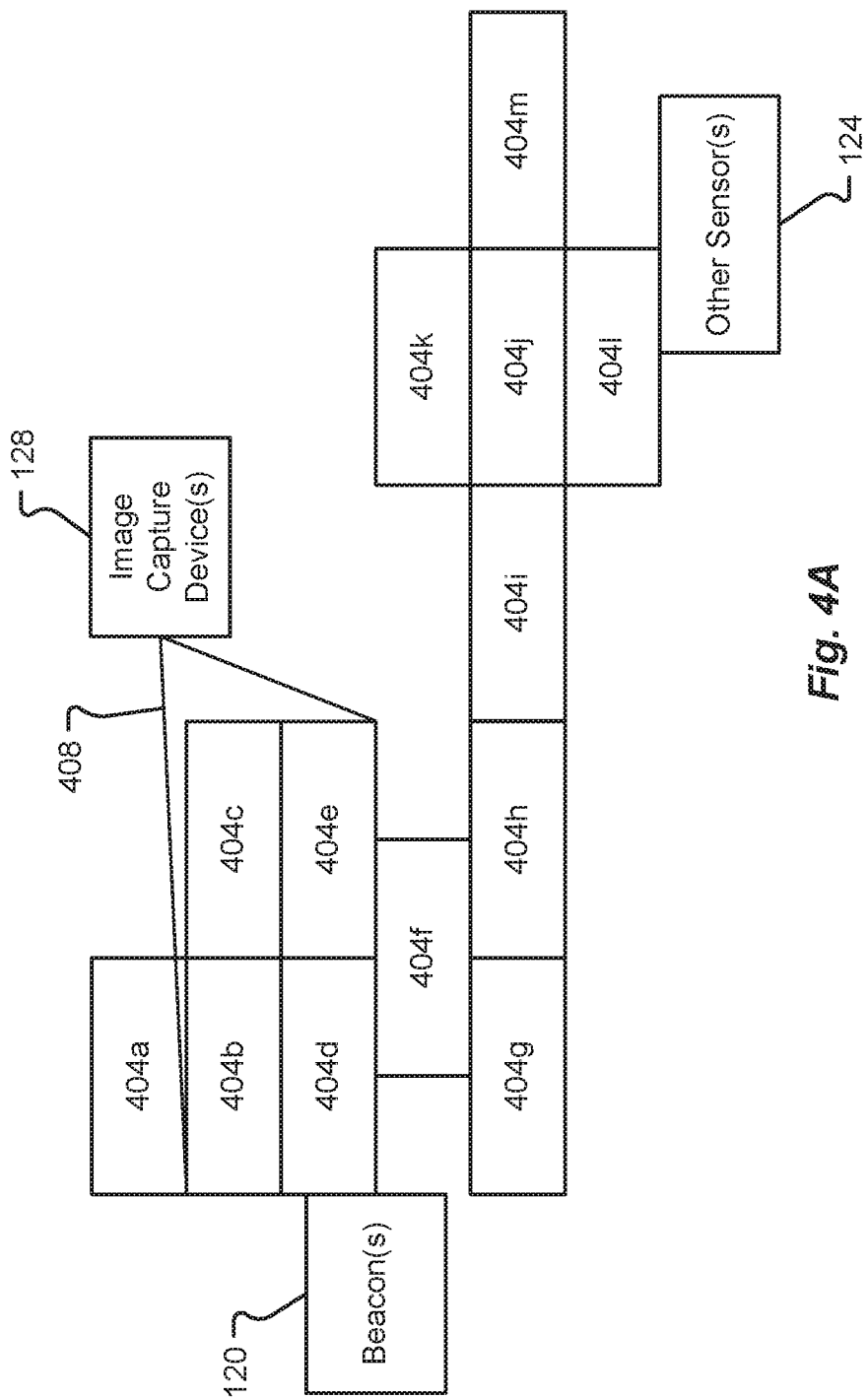

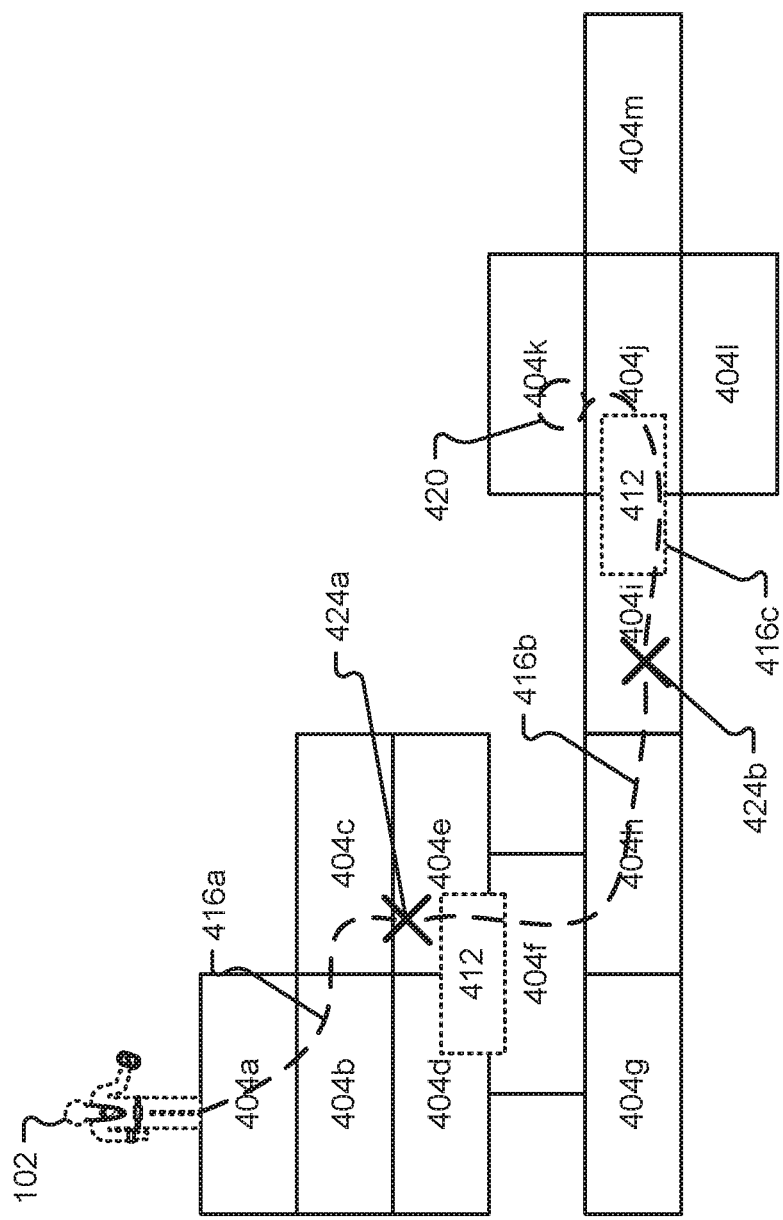

PHYSICAL ZONE PACE AUTHENTICATION

CROSS-REFERENCE TO RELATED APPLICATIONS

This application is a national stage application under 35 U.S.C. § 371 of PCT Appl. No. PCT/IB2017/001705, titled "Physical Zone Pace Authentication," filed Dec. 22, 2017, which claims the benefit of U.S. Provisional Patent Application No. 62/478,959, filed on Mar. 30, 2017, each of which is hereby incorporated herein by reference in its entirety.

FIELD OF THE DISCLOSURE

Embodiments of the present disclosure relate to mechanisms for authenticating users, particularly within a physical access control system.

BACKGROUND

The strength of current authentication methods (e.g. passwords, fingerprint authentication, etc.) is mostly constant over time. This conflicts with the fact that risks facing a secure system are usually dynamic over time.

When considering increasing the assurance level of authentication, typical methods for enhancing the level of explicit authentication methods frequently require more complex passwords or use of more accurate biometric methods like fingerprint or face recognition. Systems and methods have been proposed in which multi-factor authentication is utilized, but again these multi-factor authentication methods are usually testing something a user knows and something a user possesses. It would be desirable to introduce additional authentication mechanisms that are not based on user knowledge and/or possession. For instance, it would be desirable to provide additional mechanisms for authentication that relate to habits, actions, or inactions performed by a user without their conscious effort. Such authentication mechanisms would not only provide additional layers of security, but they may also create a more user-friendly system.

SUMMARY

It is with respect to the above that embodiments of the present disclosure were contemplated. In particular, embodiments of the present disclosure contemplate the concept to track user's pace within or between a given square or squares or physical zones, compare this path/pace analysis to historical trends (for that particular user and other users), and when this behavior is viewed as abnormal: (1) Increase authentication levels (for example require biometric authentication, or pin entry, or authentication mechanism with a One Time Password (OTP)); (2) Enable additional observation tools (such as remote cameras, or audio recording devices, motion sensors or motion tracking devices); (3) Require acknowledgement by security personnel of the alert; (4) Deny access to resources (greater than a given level) until the anomaly is acknowledged by security (monitoring) personnel; (5) Automatically present the camera view on a remote display (e.g., when a user's pace is abnormal, the camera photo is selected for viewing (it had not been on the screen prior to this anomaly being noticed)). Additional information about the user could also be presented (such as their name, gender, photo) and this information is generally information found on the card, but could be taken from a remote database based on lookup identifier from the card. The order of presentation on the display could be selected based on the pace anomaly score, or the pace anomaly score could be one of many factors used to select which cameras to display and in which order; and/or (6) The default state for a system might be to leave doors open and not require the user to badge in. However, if a pace anomaly was detected in the area, the default state would change to closed and the user would be required to badge in using a tradition physical badge or an electronic badge (such as a cell phone credential) to open the 'doors'.

In addition or in combination to the probability of moving between specific zones, and the time of day the user is likely to travel between zones, the users "pace" between zones can be measured. As used herein, the term "pace" refers to a measure of how long it takes to go from zone to zone. The pace can be an absolute number, such as the total number of steps if the user is wearing an appropriate wearable capable of detecting a number of 'steps'. It can be the total time (e.g., seconds, minutes, etc.) spent to travel to or from a zone. It can be a measure of total distance traveled in terms of meters, feet, etc. The pace can be a rate value, such as steps per second or total distance traveled per second. Pace can also be measured by incorporating both total distance traveled and the number of steps taken, and a rate of distance traveled/steps taken.

Atypical path/pace behavior (as compared to previous individual information or as compared to group trends) can lead to elevated authentication requirements and/or denied access. Groups can be defined by all individuals within an organization, or by some common attribute shared by a collection of individuals. For example, all purchasing employees may belong to a single 'group' and all manufacturing employees may belong to another 'group'. Groups may be defined by the administrator based on an organization role, or may be discovered by the software itself. For example, all employees who spend at least 50% of their time within a single zone and visit no more than 3 zones in an average day may be classified as 'static' and all future behavior compared to others who share these same tendencies.

A zone pair is a set of two physical zones where the pace of travel is measured. The physical zones in the zone pair can be distinct from one another. The physical zones in the zone pair can be identical. Identical zones within a zone pair measures how much time was spent by a subject or user within a given zone.

The average pace between zones may be measured and traced for adjacent zones. Alternatively, average pace time may be computed for zones that are a predetermined distance apart. Distance may be measured in terms of linear measurements (such as feet), steps, or number of zones. Zone pairs may be selected based upon a user's historical use pattern, and the likelihood of travel from or to the physical zone can influence if it is selected for measurement and authentication decision processes. Thus, in some embodiments, it may be desirable to track zone time between a person's desk and the entrance of their boss's office, without tracking the pace time for in-between zones. When measuring between adjacent zones, the zones pace to measure and record may be selected by the velocity rate through the zones. The greater the velocity through the zone, the less probability you track the travel time to/from the adjacent zones (instead you rely on the pace between non-adjacent zones where the user tends to stop, or their velocity is below a given threshold). Thus you might measure, but not record or store, a pace measurement for a given zone combination input for a user. Velocity can be measured in terms of the difference between exiting and entering measurements of feet/second, steps/second, feet, steps, steps/feet, or feet/steps. Thus, travel time from/to zone combinations you frequently go to and stop in, are measured and analyzed with greater frequency.

Aspects of the present disclosure include the following: (1) Detection of pace anomalies between adjacent zones; (2) Detection of pace anomalies between non-adjacent zones; (3) Adjusting authentication levels based on pace within a predefined zone for a) pace calculation as compared to user-specific historical trends and/or b) pace calculation as compared to broader historical trends; (4) Enabling additional security tools based on pace; and/or (5) Adjustment of measurement frequency and storage based on movement velocity.

In some aspects of the present disclosure, a method is provided for administering a physical access control system (that is a system which control access to physical assets such as buildings, rooms, doors, safes, parking lots, etc.). In some embodiments, the method comprises:

receiving sensor data from one or more sensors deployed in a facility, the sensor data including information describing a user's activity within a zone of the facility or a user's movement between zones of the facility;

comparing the sensor data to one or more user models that describe a normal or expected user activity within the zone of the facility or user movement between the zones of the facility;

based on the comparison of the sensor data to the one or more user models, determining that the user's activity does not fall within the normal or expected user activity within the zone of the facility or user movement between the zones of the facility; and in response to determining that the user's activity does not fall with the normal or expected user activity within the zone of the facility or user movement between the zones of the facility, decreasing a trust level assigned to the user for the physical access control system.

In some aspects, the method further includes, in response to decreasing the trust level assigned to the user, increasing authentication requirements for the user to gain access to at least one secured asset.

In some aspects, increasing authentication requirements for the user comprises requiring the user to submit to multi-factor authentication that would not otherwise be required of the user if the trust level had not been decreased.

In some aspects, the normal or expected user activity within the zone of the facility or user movement between the zones of the facility comprises a predetermined number of steps a user is expected to take within the zone of the facility.

In some aspects, the normal or expected user activity within the zone of the facility or user movement between the zones of the facility comprises a predetermined number of steps taken between the zones of the facility.

In some aspects, the normal or expected user activity within the zone of the facility or user movement between the zones of the facility comprises a combination of (i) the user following a predetermined path within the facility and (ii) the user following the predetermined path at a predetermined pace within a programmable tolerance range. As used herein, a programmable tolerance range may correspond to a variation of +/−2 meters for a predetermined path and/or +/−2 feet/second for a predetermined pace. These tolerances enable a user to act within a normal or expected range without having to behave precisely the same every time or trip.

In some aspects, the normal or expected user activity within the zone of the facility or user movement between the zones of the facility comprises a predetermined amount of time spent by the user within a particular zone of the facility.

In some aspects, the sensor data comprises a step count from an accelerometer held by the user.

In some aspects, the sensor data comprises one or more images captured from an image capture device.

In some aspects, the one or more user models include at least one of historical data specific to the user and historical data specific to a group of users that includes the user.

The term "computer-readable medium," as used herein, may refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" may be any data, set of data, encryption scheme, key, and/or transmission protocol used by a particular device (e.g., a "credential device") to authenticate and/or verify its authenticity with a reader, and/or interrogator.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, may be used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale:

FIG. 4A illustrates a physical premises in which a physical access control system can be deployed according to at least one example embodiment;

FIG. 4C illustrates a second user path travelled through the physical premises depicted in FIG. 4A;

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
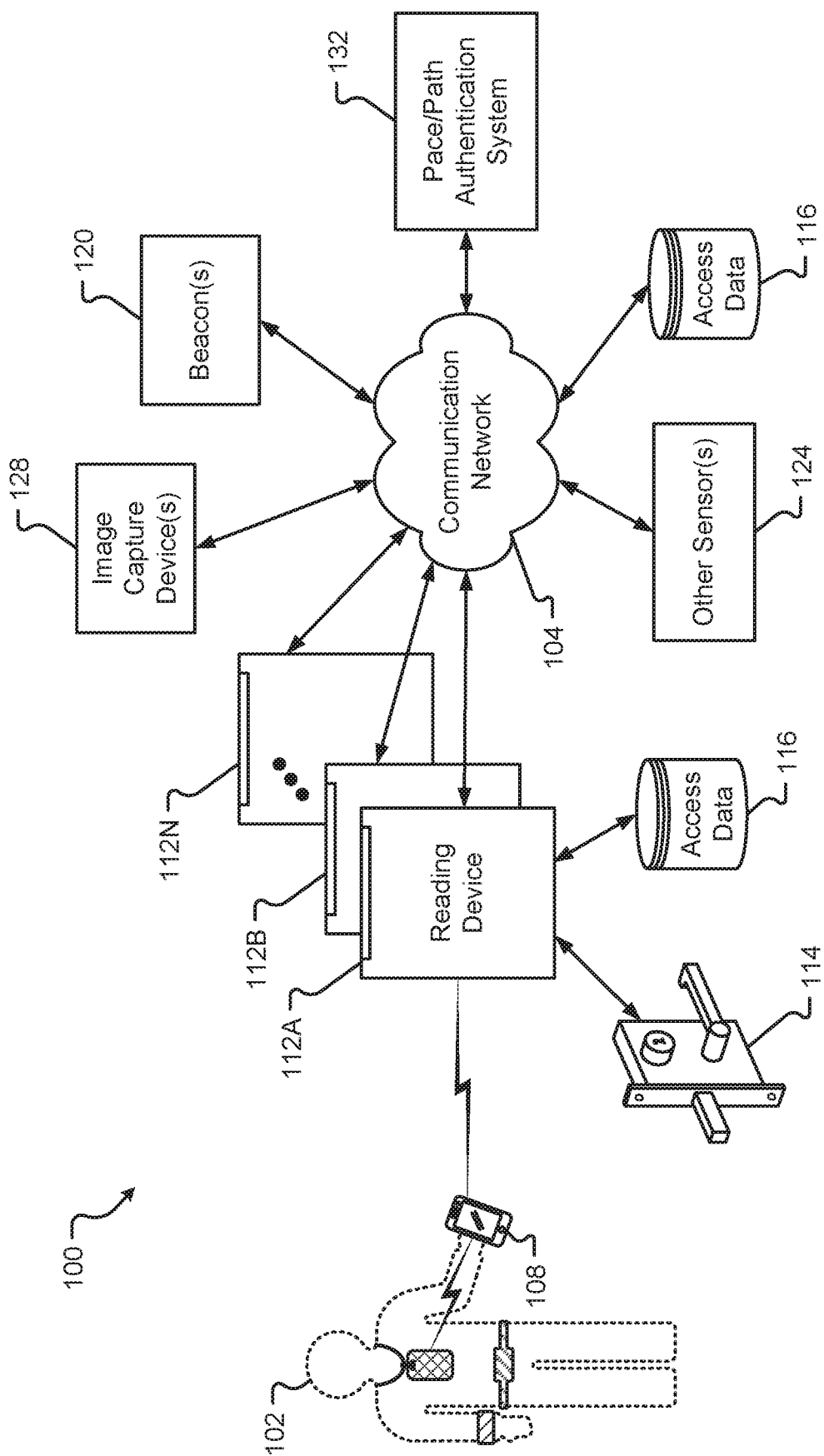
FIG. 1 illustrates an example access control system according to at least one example embodiment.

With reference to FIG. 1, an illustrative physical access control system 100 will be described in accordance with at least some embodiments of the present disclosure. The system 100 is shown to include at least one reading device 112a-N and at least one portable device 108. The reading device(s) 112 may include or have access to a database including access control data 116. The database 116 may be configured to store access control information, identification data, rules, program instructions, and/or other data associated with performing physical access operations of an access control system 100. In some embodiments, the reading device 112 may be configured to communicate with a database 116 across a communication network 104. The database 116 may be located remotely, locally, and/or distributed locally and remotely, from the reading device 112.

The portable device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the portable device 108 and the reading device 112 may be established automatically when the portable device 108 enters an active zone of an interrogating reading device 112. In one embodiment, the active zone of the reading device 112 may be defined as a three-dimensional space where the intensity of RF signals emitted by the reading device 112 exceeds a threshold of sensitivity of the portable device 108 and the intensity of RF signals emitted by the portable device 108 exceeds a threshold of sensitivity of the reading device 112. Alternatively or additionally, the portable device 108 may operate as the interrogating device and the reading device 112 may respond to interrogation signals emitted by the portable device 108.

In some embodiments, the portable device 108 may be configured to communicate with a reading device 112 across a communication network 104. The communication network 104 can include communication via at least one of conventional radio networks, wireless communication networks, Zig-Bee, GSM, CDMA, WiFi, and/or using other communication networks and/or protocols as provided herein.

The portable device 108 may communicate to the reading device 112 a single value of velocity and time the velocity measurement was taken to allow the reading device 112 to compute the pace. Alternatively or additionally, the portable device 108 may calculate and communicate the pace value to the reading device 112. The portable device 112 may communicate to the reading device 108 multiple values of geolocation and time of measurement thereby enabling the reading device 112 to perform the pace calculations. The portable device 108 may communicate multiple pace values computed within the portable device 108 to a reading device 112. Reading devices 112 may share pace calculations or velocity and time of measurement with other reading devices 112. The reading device 112 may receive geolocation and time information, compute pace, and transfer the computed pace back to the portable device 108 for later communication to other reading devices 112.

In one embodiment, authentication may be required between the portable device 108 and the reading device 112 before further communications are enabled. The further communications may provide communications in which access control information (e.g., keys, codes, credentials, etc.) is shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the portable device 108. This information may be used to validate the portable device 108. Validation may include referring to information stored in access data memory 116 or some other memory locally associated with the portable device 108 (e.g., memory that is provided on the portable device 108). Typically, a reading device 112 is associated with a particular asset (e.g., a door protecting access to a secure room, a computer lock protecting sensitive information or computer files, a lock on a safe, and the like). In one embodiment, the portable device 108 may be validated via one or more components of the access control system 100. Once the portable device 108 is authenticated, credential information associated with the portable device 108 may be validated. During this process, the reading device 112 may generate signals facilitating execution of the results of interrogating the portable device 108 (e.g., engages/disengages a locking mechanism 114, allows/disallows movement of a monitored article, temporarily disables itself, activates an alarm system, provides access to a computer system, provides access to a particular electronic document, and the like).

In addition to validating a user 102 by analyzing the pace/path of a user based upon information from a device 108 carried by the user 102, embodiments of the present disclosure also contemplate combining this with mechanisms for identifying, authenticating, and/or verifying a user 102 by other characteristics of the user 102. For instance, embodiments of the present disclosure propose the ability to monitor a user 102 passively with one or more beacon(s) 120, other sensor(s) 124, and/or image capture device(s) 128. These passive monitoring devices can be deployed throughout a physical premises and may facilitate the identification and/or authentication of a user 102 based on user actions (whether consciously or subconsciously performed), intended motions of the user 102, unintended motions of the user 102, etc. In some embodiments, these passive monitoring devices 120, 124, 128 may communicate with a pace/path authentication system 132 that performs the identification and/or authentication of the user 102 based on the inputs received from devices 120, 124, 128. As can be appreciated, a user 102 may prove their identity to the access control system 100 by a combination of information provided by their portable device 108 and information obtained by the passive monitoring devices 120, 124, 128.

In accordance with embodiments of the present disclosure, the reading device 112 may collect access control information associated with the portable device 108 before an access control decision can be made. For example, the reading device 112 may require credential information stored on the portable device 108 to validate the portable device 108. The validity of the portable device 108 may be based on the validity of a pace calculation, along with associated movement, context, etc., and/or combinations thereof. Alternatively or additionally, the portable device 108 may be in communication with one or more wearable devices on the user 102 and the portable device may provide velocity or access information from the wearable device(s) to the reading device 112 for use in pace computation or for comparison against access control data 116. In one embodiment, upon pace verification and validating credential information stored on the portable device 108 (or a wearable device), the reading device 112 generates signals facilitating execution of the results of interrogating the portable device 108 (e.g., engages/disengages a locking mechanism, allows/disallows movement of a monitored article, temporarily disables itself, activates an alarm system, provides access to a computer system, provides access to a particular document, and the like). As will be described in further detail herein, such actions may also be dependent upon detecting other information about the user 102 via one of the devices 120, 124, 128. For instance, multi-factor authentication may be required before permitting a user 102 access to a controlled space protected by a lock 114. In such an embodiment, the user 102 may be required to present their portable device 108 to the reading device 112 as well as pace/path analysis based on information passively gathered by one of the devices 120, 124, 128. In some embodiments, these access control decisions may be made at the reading device 112 or at a pace/path authentication system 132 (or at a combination of the two devices). Such decisions can be made based on information stored at these system elements or with reference to access data 116.

Pace history may be stored on the portable device 108, the reading device 112, the lock 114, and/or be a component of the access data 116.

The pace/path authentication system 132 may include a processor, a memory, and one or more inputs/outputs. As an illustrative but non-limiting example, the system 132 may be operated on a server or a collection of servers. The memory of the system 132 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the system 132 may communicate with an access data memory 116. Like the memory of the system 132, the access data memory 116 may comprise a solid state memory or devices. The access data memory 116 may comprise a hard disk drive or other random access memory.

In some embodiments, the reading device 112 may be configured to communicate with one or more devices across a communication network 104. For example, the reading device 112 may communicate with a portable device 108 across the communication network 104. Among other things, this communication can allow for back-end authentication and/or provide notifications from the reading device 112 to the portable device 108. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, RS-485, similar networks used in access control systems between readers and control panels, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

Figure 2:
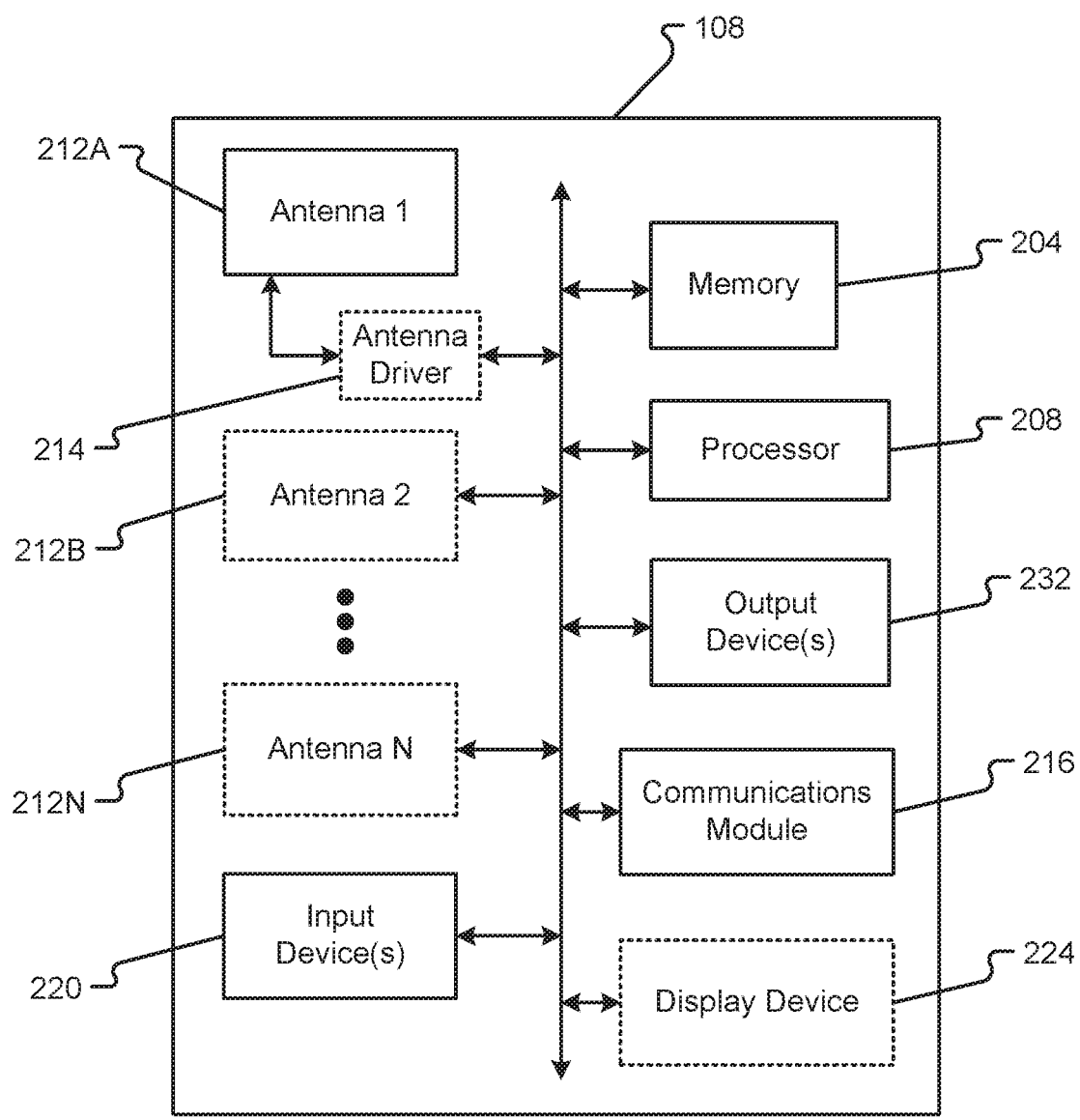
FIG. 2 illustrates an example structure of a mobile device according to at least one example embodiment.

Referring now to FIG. 2, a block diagram depicting a portable device 108 is shown in accordance with embodiments of the present disclosure. The portable device 108 may include one or more components, such as, a memory 204, a processor 208, an antenna 212A-N, a communications module 216, one or more input devices 220, and one or more display devices 224. In some embodiments, the portable device 108 may further include a power module. As can be appreciated, the portable device 108 may also provide one or more mechanisms for passively detecting pace and/or path travelled by a user, a number of steps taken by a user within a predetermined time, a number of steps taken by a user within a particular area, an amount of time that a user 102 carrying the device 108 has been at a particular location, and so on. Said another way, one or more sensors or input devices 220 of the device 108 can be used to help gather pace/path information about a user. Alternatively or additionally, the portable device 108 may receive information about a user 102 from a wearable device worn by the user 102. For instance, the user 102 may have a wearable device that counts a number of steps taken by the user 102 and that wearable device may communicate the step count information to the portable device 108 where it is stored and/or communicated to the pace/path authentication system 132 via the communication network 104.

The memory 204 of the portable device 108 may be used in connection with the execution of application programming or instructions by the processor 208, and for the temporary or long term storage of program instructions and/or data. The memory 204 may contain executable functions that are used by the processor 208 to run other components of the portable device 108. In one embodiment, the memory 204 may be configured to store credential information. For instance, the credential information may include, but is not limited to, unique identifications, manufacturer identification, passwords, keys, encryption schemes, transmission protocols, and the like. In some embodiments, the memory 204 may be configured to store configuration information, identification information, authentication information, and/or the like. In some embodiments, the memory 204 may comprise volatile or non-volatile memory and a controller for the same. Non-limiting examples of memory 204 that may be utilized in the portable device 108 include RAM, ROM, buffer memory, flash memory, solid-state memory, or variants thereof.

The processor 208 may correspond to one or many microprocessors that are contained within the housing of the portable device 108 with the memory 204. In some embodiments, the processor 208 incorporates the functions of the user device's Central Processing Unit (CPU) on a single Integrated Circuit (IC) or a few IC chips. The processor 208 may be a multipurpose, programmable device that accepts digital data as input, processes the digital data according to instructions stored in its internal memory, and provides results as output. The processor 208 implements sequential digital logic as it has internal memory. As with most known microprocessors, the processor 208 may operate on numbers and symbols represented in the binary numeral system.

The one or more antennas 212A-N may be configured to enable wireless communications between the portable device 108 and a reading device 112, a wearable device, and/or some other device. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver. One or more of the antennas 212A may be driven or operated by a dedicated antenna driver 214.

In some embodiments, the portable device 108 may include a power module. The power module may be configured to provide power to the parts of the portable device 108 in order to operate. The power module may store power in a capacitor of the power module. In one embodiment, electronics in the power module may store energy in the capacitor and turn off when an RF field is present. This arrangement can ensure that energy is presented to the portable device 108 minimizing any effect on read distance. Although the portable device 108 may be configured to receive power passively from an electrical field of a reading device 112, it should be appreciated that the portable device 108 may provide its own power. For example, the power module may include a battery or other power source to supply power to parts of the portable device 108. The power module may include a built-in power supply (e.g., battery) and/or a power converter that facilitates the conversion of externally-supplied AC power into DC power that is used to power the various components of the portable device 108. In some embodiments, the power module may also include some implementation of surge protection circuitry to protect the components of the portable device 108 from power surges.

The portable device 108 may include a communications module 216 that is configured to communicate with one or more different systems or devices either remotely or locally to the portable device 108. Thus, the communications module 216 can send or receive messages to or from reading devices 112, wearable devices, the behavior (path and/or pace) authentication system 132, access control systems, or other systems and/or devices. In some embodiments, the communicated information may be provided to, or exchanged with, other components within the portable device 108.

The input device(s) 220 may include at least one device sensor. Among other things, a device sensor may be configured to detect a state of the portable device 108 or location of the portable device 108 or the number of steps taken by the wearer of the device, and, therefore, a state or pace/path of the user 102 holding the portable device 108. Illustrative but non-limiting sensors include one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. As can be appreciated, one or more of these sensors may alternatively or additionally be incorporated into a wearable device. It is an aspect of the present disclosure that the processor 208 of the portable device 108 may receive the sensor information and determine whether the portable device 108 is in motion, still, lit or unlit, etc., and/or combinations thereof. Other suitable sensors may include one or more of a gyroscope, accelerometer, transducer, and/or other mechanical detection component that are each configured to detect a force and/or motion associated with the portable device 108. This detected motion of the portable device 108 may be compared, via the processor 208 of portable device 108, to known motion profiles stored in the memory 204 or other associated memory in determining a state of the portable device 108. Yet another type of suitable sensor that can be included in the input device(s) 220 is a location sensor. A location sensors may be configured to determine a geographical location and/or position of the portable device 108. In one embodiment, this location may be based on Global Positioning System (GPS) data provided by a GPS module of the portable device 108. In some embodiments, the location of the portable device 108 may be provided based on cell tower data, WiFi information, iBeacon information, and/or some other location information provided by a location module and/or a communications module 216 of the portable device 108. In one embodiment, the authentication of a user may be based at least partially on determining a location of the portable device 108. In some embodiments, one or more features of the portable device 108 may be controlled based on a location and/or state of the portable device 108.

In some embodiments, the portable device 108 may include a user interface, a reader interface, and/or a network interface. The user interface may or may not include one or more input devices 220 and/or display devices 224. Examples of suitable user input devices that may be included in the user interface include, without limitation, buttons, keyboards, mouse, touch-sensitive surfaces, pen, camera, microphone, etc. Examples of suitable user output devices that may be included in the user interface include, without limitation, display screens, touchscreens, lights, speakers, etc. It should be appreciated that the user interface may also include a combined user input and user output device, such as a touch-sensitive display or the like.

The reader interface may correspond to the hardware that facilitates communications with the credential for the portable device 108. The reader interface may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface is specifically provided to facilitate proximity-based communications with a credential via communication channel or multiple communication channels. The network interface may comprise hardware that facilitates communications with other communication devices over the communication network 104. The network interface may include an Ethernet port, a Wi-Fi card, a Network Interface Card (NIC), a cellular interface (e.g., antenna, filters, and associated circuitry), or the like. The network interface may be configured to facilitate a connection between the portable device 108 and the communication network 104 and may further be configured to encode and decode communications (e.g., packets) according to a protocol utilized by the communication network 104

If NFC is being used for the communication channel, then the reader 112 and portable device 108 may have their interfaces/antennas inductively coupled to one another at which point the reader and/or portable device 108 will authenticate or mutually authenticate with one another. Following authentication, the reader 112 may request a key or multiple keys from the portable device 108, or the portable device 108 may offer a key or multiple keys to the reader 112. Upon receiving the key(s) from the portable device 108, the reader 112 may analyze the key(s) and determine if the key(s) are valid and, if so, allow the holder/user of the portable device 108 access to the asset protected by the reader 112. It should be appreciated that the portable device 108 may alternatively or additionally be configured to analyze information received from the reader 112 in connection with making an access control decision and/or in connection with making a decision whether or not to provide key(s) to the reader 112.

If, for instance, BLE or some other non-inductive protocol (e.g., Wi-Fi) is being used for the communication channel, then the reader 112 and portable device 108 may perform a discovery routine prior to pairing with one another or otherwise connecting to establish the communication channel. After the channel is established, however, the reader 112 and portable device 108 may then authenticate one another and exchange relevant information, such as the key(s), to enable an access control decision to be made, including the use of pace authentication. If a positive access control decision is made (e.g., it is determined that the key(s) are valid and the portable device 108 is allowed to access the asset protected by the reader 112), then the reader 112 may initiate one or more actions to enable the holder/user of the portable device 108 to access the asset protected by the reader 112.

Figure 3:
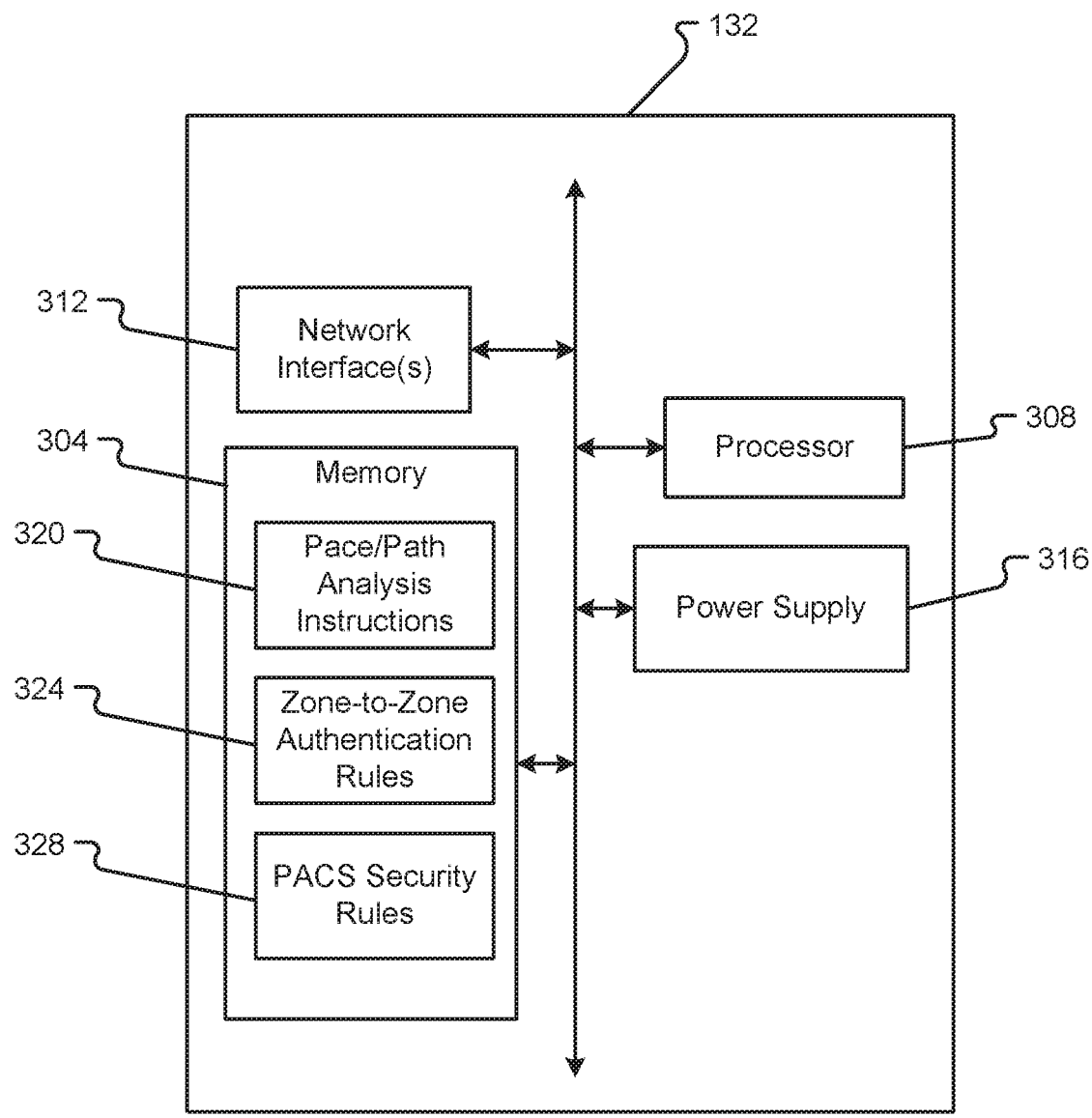
FIG. 3 illustrates an example structure of a pace/path authentication system according to at least one example embodiment.

With reference now to FIG. 3, additional details of a pace/path authentication system 132 will be described in accordance with at least some embodiments of the present disclosure. The pace/path authentication system 132 may be provided as one or more servers capable of performing the features and functions described herein related to passively determining a behavior or action of a user 102 and, based on such information, determining whether to change authentication requirements for physical zones in a physical access control system, whether a user 102 is allowed access to a secured physical asset, whether a door or lock should be unsecured or secured for a particular user 102, combinations thereof, etc. The pace/path authentication system 132 may be provided as part of a dedicated access control system or the pace/path authentication system 132 may service multiple different physical access control systems. For instance, the pace/path authentication system 132 may provide analysis services for multiple different sites having different sets of distributed reading devices 112 and passive sensing devices 120, 124, 128.

As seen in FIG. 3, the pace/path authentication system 132 may include one or more processors 308, memory 304, one or more network interfaces 312, and a power supply 316. If embodied as something other than a server, the system 132 may further include user input and/or output devices.

The processor 308 may be similar or identical to processor 208. For instance, the processor 308 may include one or more CPUs, General Processing Units (GPUs), Integrated Circuit (IC) chips, microprocessors, etc. Alternatively or additionally, the processor 208 may include other hardware components that are capable of executing the instructions stored in memory 304.

The memory 304 may be similar or identical to memory 204. The memory 304 can be configured to store processor-executable instructions in volatile or non-volatile memory devices. The types of instructions that may be stored in memory 304 include, without limitation, pace/path analysis instructions 320, zone-to-zone authentication rules 324, and PACS security rules 328. The pace/path analysis instructions 320 may be used to help determine a current pace or path of travel of a user 102 within a PACS environment or a facility having reading devices 112 deployed therein. In some embodiments, the pace/path analysis instructions 320 may be capable of determining a current location of a user 102 within a facility, a number of steps taken by a user 102 within a particular zone of a facility, a number of steps taken between adjacent or non-adjacent zones of a facility, an amount of time a user 102 has been within a zone of a facility, an amount of time taken to travel between zones of a facility, a path travelled within a facility, etc. The pace/path analysis instructions 320 may also compare the determined pace or path of a user 102 to historical pace or path information of the user 102. Alternatively or additionally, the pace/path analysis instructions 320 can compare the determined current pace/path of a user to historical pace/paths of other users within the facility. The pace/path analysis instructions 320 may also be automatically updated based on ongoing user paces and/or paths with one or more machine learning algorithms or neural networks.

The zone-to-zone authentication rules 324 may define the types of events or behaviors that will enable a user 102 to travel freely from one zone to another zone in a facility, prohibit a user 102 from travelling freely between zones, and/or require a user 102 to present additional authentication information before being allowed access into or out of a particular zone. For instance, the zone-to-zone authentication rules 324 may define that a user 102 moving at a "normal" or expected pace between zones should be allowed free access or only have to provide a single piece of information in connection with authenticating themselves to a reading device 112. Again, the definition of "normal" may be based on that user's 102 particular pace or path history and/or the pace/path histories of other users in the same facility. However, the zone-to-zone authentication rules 324 may also dictate when a particular user 102 is required to provide additional levels of authentication—meaning additional as compared to normal levels of authentication (e.g., input a known PIN or password, submit biometric authentication in the form of fingerprint or face data, present their portable device 108 to a reading device 112, etc.). For instance, if a user's 102 pace or path is abnormal, the user 102 is travelling a different or infrequently-traveled path, the user 102 is remaining within a zone longer than an allowable amount of time, etc., then the zone-to-zone authentication rules 324 may dictate that additional authentication is required for that zone.

The PACS security rules 328 may be similar or integrated with the zone-to-zone authentication rules 324. The PACS security rules 328, however, may be more generic to baseline or standard security preferences and requirements for the system 100. For instance, the PACS security rules 328 may dictate that only one user is allowed to pass through a door or turnstile at a time, that users must at least present their credentials in the form of portable devices 108 to obtain access to secured assets, that users cannot share credentials, etc. The zone-to-zone authentication rules 324 can be thought of as augmenting the PACS security rules 328, but both sets of rules may work together to maintain the security of the PACS system while also attempting to minimize the negative impacts or burdens on users of the system.

The network interface(s) 312 may correspond to one or more hardware devices that connect the pace/path authentication system 132 to the communication network 104. For instance, the network interface(s) 312 may include one or more wired or wireless serial or parallel data ports. As a more specific example, the network interface(s) 312 may include an Ethernet port, a SCSI port, or the like. The network interface(s) 312 may also include drivers for the hardware components thereof.

The power supply 316 may correspond to internal and/or external power supply devices. For instance, the power supply 316 may correspond to a battery pack, capacitive charge device, or the like. Alternatively or additionally, the power supply 316 may correspond to a power adapter that enables the behavior authentication system 132 to receive AC power from an external outlet and convert that AC power into DC power or useable power for the components of the system 132.

With reference now to FIGS. 4A-E, different scenarios related to user activity within a facility and possible system responses thereto will be described in accordance with at least some embodiments of the present disclosure. With initial reference to FIG. 4A, a facility having a plurality of zones 404a-m is depicted. The facility may correspond to a large or small physical facility. Examples of a facility include, without limitation, an office building, a hotel, a house, a university campus, a government campus or building, etc. The zones 404a-m may be indoors, outdoors, or combinations thereof. Furthermore, the zones 404a-m do not necessarily need to be of the same type, have the same size or shape, or be limited in any way. As used herein, the term "zone" refers to any area or volume of physical space with defined, but not necessarily precisely defined, boundaries. As one non-limiting example, zone 404a may correspond to a courtyard or lobby of an office building whereas zone 404b may correspond to an internal room or portion of a room within the office building. The size of the zones 404a-m may be predefined by room size (e.g., by position of walls) or the read range of a reading device 112. Alternatively or additionally, a size of a zone may be defined by a field of view of an image capture device 128.

As can be appreciated, passage from one zone to another may or may not be protected by a lock 114 and/or reading device 112 operating in connection with the lock 114. In some embodiments, free passage may be allowed between some zones (e.g., between different portions of a hall or corridor) whereas passage is controlled between other zones (e.g., from one room to another, from a hall to an elevator, etc.). In some embodiments, a user 102 exhibiting normal zone-to-zone movement between certain zones may be allowed free or minimally invasive passage between other controlled zones whereas other users 102 exhibiting abnormal zone-to-zone movement or unrecognized movement pace or path may have to endure additional or elevated access control protocols (e.g., multi-factor authentication). The zone-to-zone movement of a user 102 can be passively determined by one or more monitoring devices 120, 124, 128 deployed throughout the facility. Advantageously, one or more of these devices 120, 124, 128 may initially be used to passively detect zone-based activities or behaviors of users and, if necessary, these devices 120, 124, 128 may also be used for receiving authentication information from a user 102. As an example, an image capture device 128 can help detect a user's zone-to-zone movement to determine if additional security restrictions should be imposed on the user. If additional security restrictions are determined as being necessary, then the image capture device 128 can be dual-purposed to capture biometric information of the user 102 (e.g., capture images of the user's face for facial recognition) or the like. Accordingly, a single piece of hardware deployed in the facility can provide multiple purposes or uses in connection with maintaining the security of the facility.

Figure 4B:
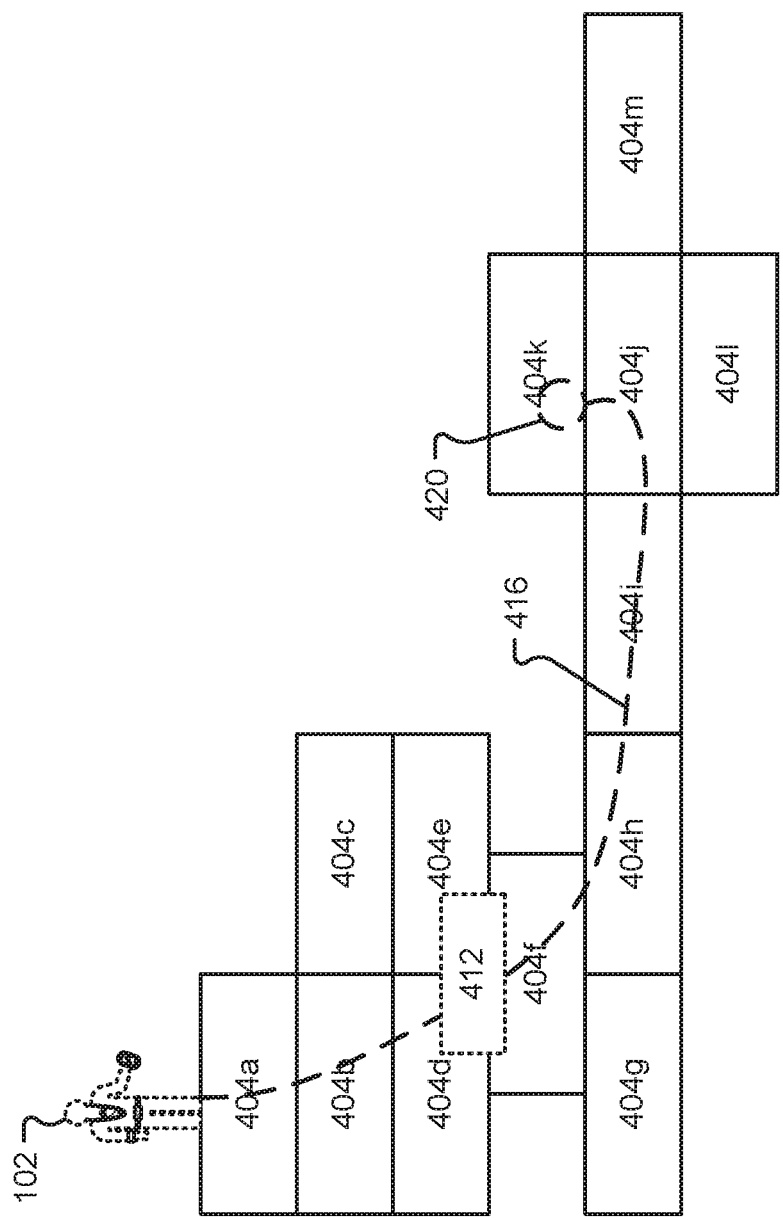
FIG. 4B illustrates a first user path travelled through the physical premises depicted in FIG. 4A.

With reference now to FIG. 4B, a first scenario is depicted and will be described in accordance with at least some embodiments of the present disclosure. FIG. 4B shows a user 102 starting a path of travel 416 at a first zone 404*a* and terminating that path of travel 416 at a destination 420, which coincides with an eleventh zone 404*k*. The path of travel 416 is shown as having to go through at least one controlled access point 412. The controlled access point 412 is shown as being between zones 404*f* and two other zones 404*d*, 404*e*. The user's 102 path of travel 416 may be monitored by one or more devices 120, 124, 128 beginning at the first zone 404*a*. If the user 102 has travelled this path previously (e.g., more than a predetermined number of times and with a particular regularity of path travelled and pace), then the pace/path authentication system 132 may be allowed to determine that the user 102 is following a "normal" path of travel that starts at zone 404*a*, next proceeds to zone 404*b*, and next proceeds to zone 404*d*. If the passive monitoring devices 120, 124, 128 (and perhaps the user devices 108 and/or the wearable devices) also reveal that the user 102 is travelling the normal path 416 at a normal pace or by taking a predetermined number of steps within a predetermined amount of time before arriving at the controlled access point 412, then the pace/path authentication system 132 may determine that the user 102 is allowed access or more likely than not a trusted user of the system. In response to making such a determination, the pace/path authentication system 132 may instruct the controlled access point 412 to automatically admit the user 102 through or to require only a minimal amount of authentication in accordance with PACS security rules 328. If, however, the user 102 traversed zones 404*a*, 404*b*, 404*d*, but took too many steps (e.g., more than a predetermined number), took too long (e.g., more than a predetermined amount of time), took too many steps per zone, took too few steps per zone, took too many steps within a single zone, or too few steps within a single zone, or exhibited some other abnormal pace/path prior to arriving at controlled access point 412, then the pace/path authentication system 132 may enforce additional security at controlled access point 412. For instance, the user 102 may be required to submit to multi-factor authentication, present higher levels of multi-factor authentication (e.g., provide a shared secret and submit to biometric authentication), etc. In this way, users 102 moving from zone-to-zone in an expected or trusted way may be subjected to reduced security requirements at controlled access point 412 as compared to other users 102. This type of passive zone-to-zone (path and/or pace) behavioral analysis can help to provide users 102 with improved system usability without sacrificing the overall security of the facility.

Contrasted with the scenario of FIG. 4B, FIG. 4C shows a different scenario where the same user 102 travels an unexpected or varied path. In the depicted example, the user 102 also stops for an amount of time at rest locations 424*a* and 424*b* within zones 404*e* and 404*i*, respectively. Initially, the user 102 may traverse a first portion of path 416*a* when heading toward a controlled access point 412 restricting access to zone 404*f*. Either because the user 102 travelled an abnormal path that didn't include zone 404*d* or because of the user 102 stopping at location 424*a*, the pace/path authentication system 132 may determine that the user 102 is not inherently trusted. Based on this determination, the user 102 may be subjected to heightened authentication requirements at the first controlled access point 412. If the user 102 succeeds in moving past the first controlled access point 412, the passive analysis of the user 102 may continue along the second portion of the path 416*b*. Perhaps because the user 102 stopped again at location 424*b*, the system 132 may decide that further authentication is required at another access control point that protects zone 404*j*. Before the user 102 is allowed to continue to the third portion of path 416*c* and reach the destination 420, the user 102 may again have to perform some level of identity verification with the controlled access point 412. Had the user 102 not stopped at location 424*b* (or otherwise acted abnormally in zone 404*i*), the user 102 may have been allowed to freely pass to zone 404*j*, for example.

If a zone pace calculation causes the gathering of additional factors of authentication, (for example biometrics), the additional factor input, or the results of the additional factor authentication (did the biometric match for the user's identity) may be communicated to an additional reading device to reduce the need to repeatedly input the same information in a short period of time.

Figure 4D:
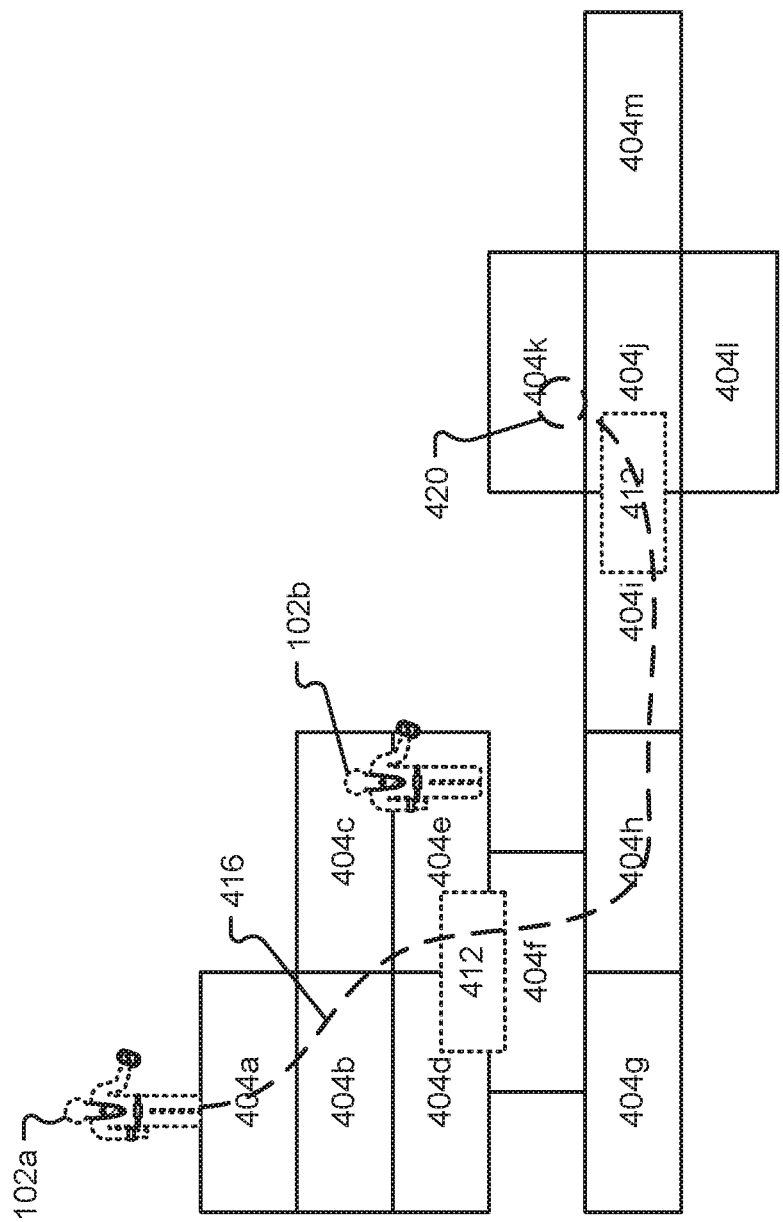
FIG. 4D illustrates a third user path travelled through the physical premises depicted in FIG. 4A.

FIG. 4D shows a similar scenario to the scenario of FIG. 4B except that multiple users 102*a*, 102*b* are detected in zone 404*e* and the first user 102*a* may not necessarily have conformed to a normal path of travel to destination. In this depicted embodiment, when the two users 102*a*, 102*b* are detected in the zone 404*e*, the pace/path authentication system 132 may require that the moving user (e.g., the first user 102*a*) only be subjected to one level of authentication whereas the non-moving user (e.g., the second user 102*b*) must be subjected to a different (e.g., increased) level of authentication to gain access through control point 412 to zone 404*f*. In this example, if the second user 102*b* is initially positioned in zone 404*e* (e.g., reading a document, talking with another user, etc.) when the first user 102*a* arrives in the same zone 404*e*, the pace/path authentication system 132 may detect the first user's 102*a* movement toward the control point 412 and allow that user relatively easy access through; however, the second user 102b may be required to submit additional information (e.g., biometric, shared secret, second credential, etc.) to a reading device 112 associated with the control point 412 that the first user 102a did not have to submit. These differing trust levels may be assigned to each user 102a, 102b individually based on the user's specific behaviors and/or travel patterns from zone-to-zone or within zones. Users that behave in a way to earn a higher trust level may be afforded easier passage from zone-to-zone whereas other users that do not behave in the same way may not earn such trust levels. Levels of trust associated with a given pace may include input such as has this user recently been identified by security personnel.

Figure 4E:
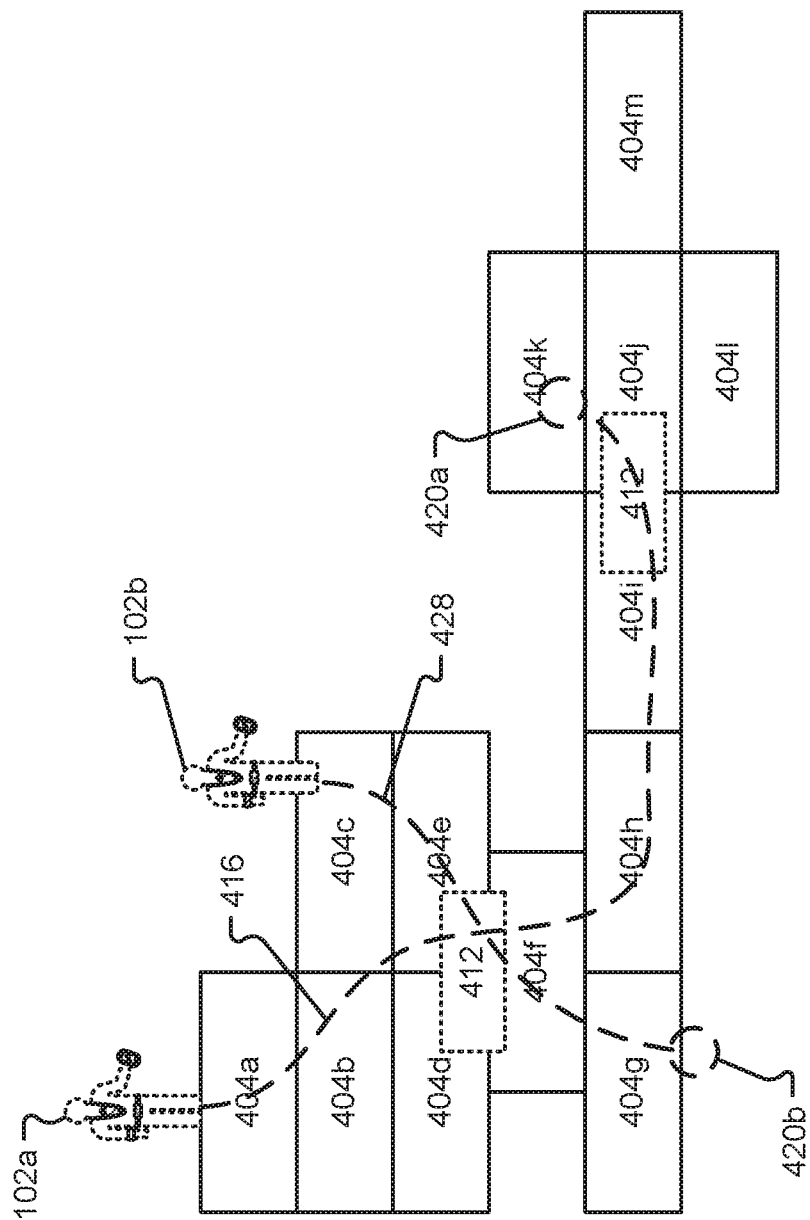
FIG. 4E illustrates multiple user paths travelled through the physical premises depicted in FIG. 4A.

FIG. 4E shows yet another scenario in which different users may be assigned different trust levels within a common zone and, therefore, be subjected to different authentication/verification requirements at a common access control point 412. Specifically, the first user 102a is shown traversing one path 416 toward a first destination 420a whereas a second user 102b is shown traversing another path 428 toward a second destination 420b. In some embodiments, the path travelled or the user's speed in travelling from zone-to-zone may dictate whether that particular user is subjected to increased or decreased identity verification requirements. In some embodiments, if both users 102a, 102b follow a path identified as "normal" for that user (or a group of users in a historic database) and the user's pace from zone-to-zone is also identified as "normal", then each user may be allowed to have the same trust level assigned thereto. However, because the first user 102a traversed more zones than the second user 102b, there is more zone-to-zone information available for the first user 102a. This may dictate that the first user 102a is allowed to have a relaxed identity verification at the control point 412 as compared to the second user 102b.

As used herein, the term "normal" or "expected" is understood to include situations where a user's actions are within a predetermined range of a defined model. Actions that can be represented in the model include, without limitation, zone-to-zone path followed and/or pace within or between zones. For instance, a user may not be required to strictly follow the same path within millimeters to be considered as following a "normal" or "expected" path. Rather, a configurable tolerance may be programmed into the system to define the "normal" or "expected" path. As long as the user's current actions or behaviors are falling within the configurable tolerances of the model action, then the user's current actions may be considered "normal" or "expected." In some embodiments and as a non-limiting example, the a number of steps within a zone may be identified as a model action for a user (e.g., 12 steps per zone). A configurable tolerance for the model action may be identified as plus or minus 3 steps per zone. Thus, as long as that user conforms their number of steps within the zone to be between 9 and 15, then the user will be determined to be acting "normally" or as "expected" with respect to the number of steps taken within the zone. If the user's actual or current steps falls outside of the range between 9 and 15, then the user may be determined to be acting "abnormally" or out of conformity with the model. In such situations, the user may not earn the higher levels of trust and, therefore, may be subjected to heightened security requirements at a particular control point or throughout the physical access control system. As can be appreciated, the model can change over time and should not be construed as necessarily being static. The model action(s) can be determined by a number of factors and can be measured by a number of passive monitoring devices 120, 124, 128.

Figure 5:
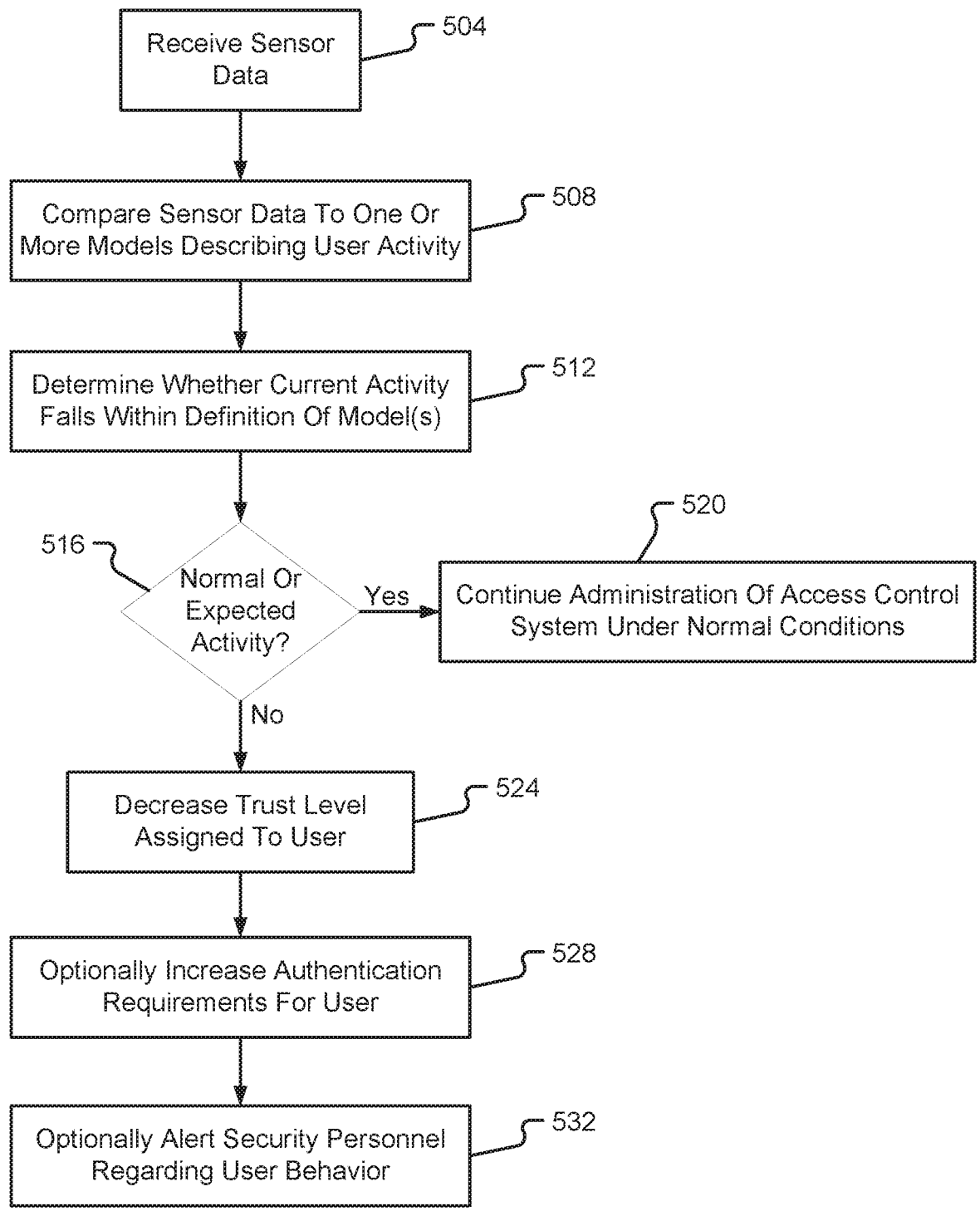
FIG. 5 is a flow chart illustrating a first method of administering an access control system in accordance with embodiments of the present disclosure.

With reference now to FIG. 5, a method of administering or operating a physical access control system 100 will be described in accordance with at least some embodiments of the present disclosure. The method begins by receiving sensor data from one or more sensors (step 504). In some embodiments, the sensors may be deployed throughout a physical premises and the examples of sensors may include one or more of the monitoring devices 120, 124, 128 depicted and described herein. The sensor data may be received at a reader 112, at a control panel, and/or at the pace/path authentication system 132, where the sensor data can be compared to one or more models describing user activity (step 508). In some embodiments, the sensor data is compared to multiple models describing one or more of: historical normal and/or abnormal activity specific to a particular user, historical normal and/or abnormal activity specific to a group of users, historical normal and/or abnormal activity related to a group of all users of the physical access control system, etc. In some embodiments, the model(s) may be provided in any form or format (e.g., as coefficients to one or more known parameters, as multifactorial variables, as data clusters, etc.). The sensor data may be compared to the model(s) as raw data or the sensor data may be processed prior to being compared to the models. In some embodiments, different models may be provided for different types of sensor data. For instance, a particular path or pace model may be provided for image or video data whereas a different path or pace model may be provided for other sensor data (e.g., step data, velocity data, acceleration data, zone-to-zone path data, etc.).

Based on the comparison of the sensor data to the models, the entity performing the comparison (e.g., the pace/path authentication system 132) determines whether the current user activity falls within a definition of one or more models (step 512). In some embodiments, the sensor data associated with the user or group of users may be compared to normal and/or abnormal models to determine whether the current activity corresponds to a normal or expected activity (step 516). For instance, if the comparison of the sensor data is being made against models of normal or expected user behavior and the sensor data is determined to satisfy or fall within that model, then the user may be considered to be exhibiting normal or expected pace/path activity. Alternatively, if the comparison of the sensor data is being made against models of abnormal user behavior and the sensor data is determined to satisfy or fall within that model, then the user may be considered to be exhibiting abnormal or unexpected pace/path activity.

If the query of step 516 is determined to be answered in the affirmative, then the physical access control system will continue to be administered under normal conditions and the user may be allowed to access one or more physical assets using normal or a least onerous set of authentication requirements (step 520). On the other hand, if the query of step 516 is answered negatively, then the user may be assigned to decreased level of trust (step 524). Such an assignment of a decreased level of trust may cause the user to have to submit to more onerous authentication requirements. Said another way, the authentication requirements for that user may be optionally increased at least for a predetermined amount of time or until the user begins exhibiting normal or expected behaviors (step 528). Alternatively or additionally, if the user successfully passes the increased authentication requirements but continues to exhibit different or unexpected behaviors, then one or more models specific to that user may be updated to include the newer behaviors as normal (assuming that the user continues to successfully pass authentication challenges).

As another optional step following the determination that abnormal or unexpected user path/pace activity is detected in step 516, the method may continue by alerting security personnel regarding the user's current behavior (step 532). In some embodiments, the security personnel may be alerted as to why the user's current behavior does not satisfy normal or expected models (e.g., an indication of the model violation and/or an indication of the sensor data that resulted in the model violation). The optional alert(s) may be provided by sounding a siren or alarm or, alternatively, providing a silent message to the security personnel (e.g., as a direct message, email, or screen pop on a security console).

Figure 6:
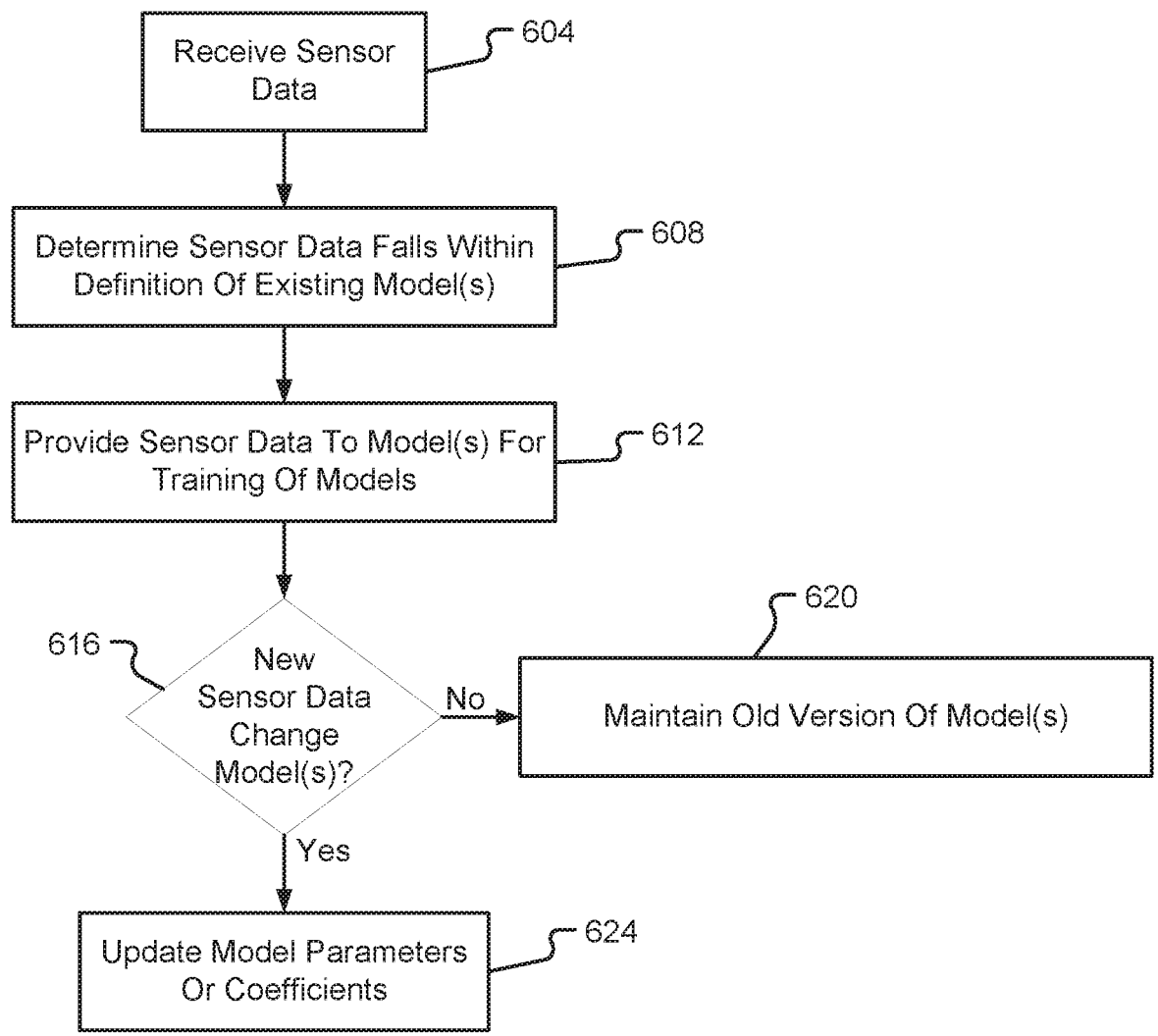
FIG. 6 is a flow chart illustrating a method of training pace and/or path authentication models in accordance with embodiments of the present disclosure.

With reference now to FIG. 6, additional details regarding a method for updating or training data models regarding user pace and/or path travel within a physical access system will be described in accordance with at least some embodiments of the present disclosure. The method begins when sensor data is received (step 604). In some embodiments, the sensor data may be received as individual sensor data (e.g., sensor data of a particular type, sensor data from a particular sensor, etc.) or as a collection of sensor data (e.g., sensor data of multiple types, sensor data from multiple sensors, etc.). The sensor data may be received in one or more packets or data streams at the pace/path authentication system 132 where it is stored in memory.

Figure 7:
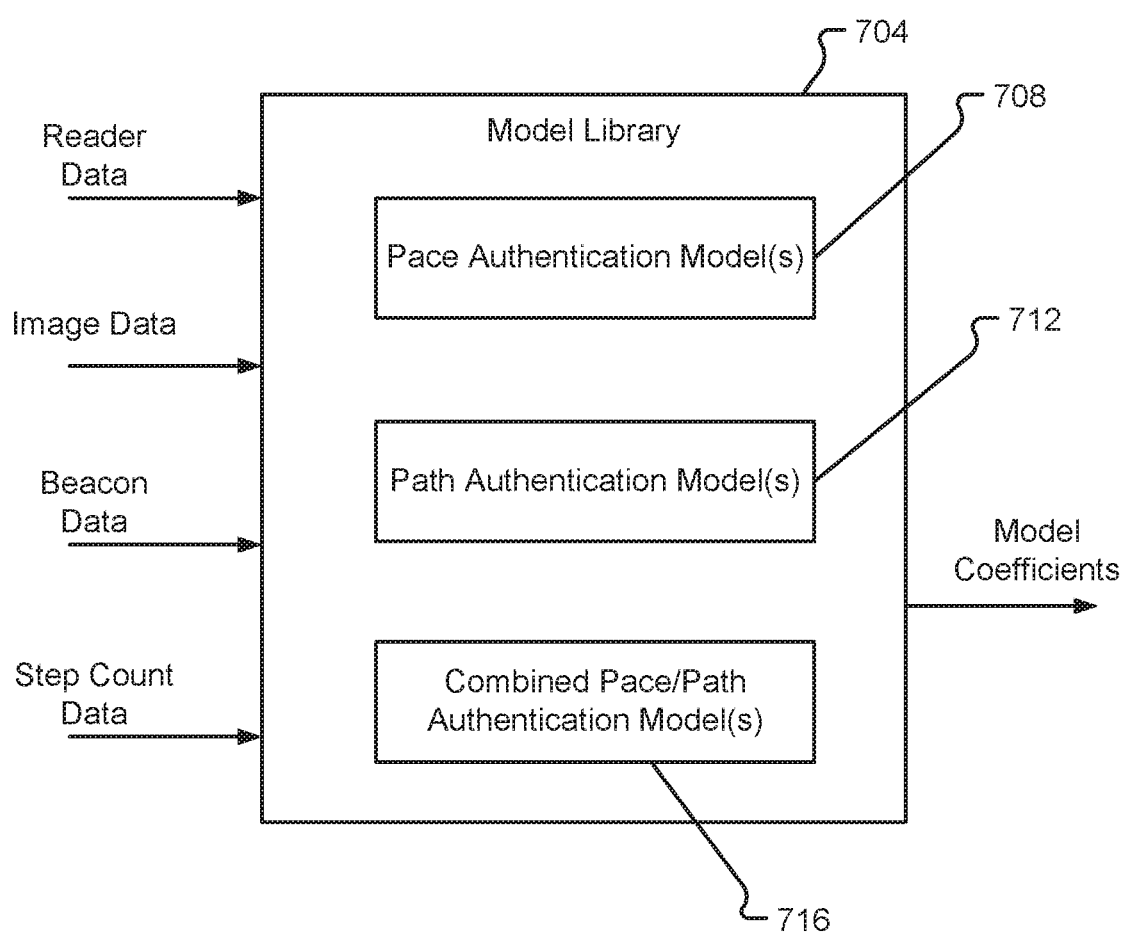
FIG. 7 is a block diagram depicting an illustrative set of authentication models in accordance with embodiments of the present disclosure.

The pace/path authentication system 132 may then determine if the sensor data falls within a definition of one or more existing models (step 608). As can be appreciated, the pace/path authentication system 132 may maintain one or a plurality of different data models. Examples of such models are depicted in FIG. 7. As some non-limiting examples, the pace/path authentication system 132 may maintain a model library 704 containing one or more pace authentication models 708, one or more path authentication models 712, and/or one or more combined pace/path authentication models 716. The sensor data in the form of reader data, image data, beacon data, and/or step count data may be compared to one, some, or all of the models within the model library maintained at the pace/path authentication system 132. Based on whether or not the data falls within a definition of an existing model, the method may continue by providing the sensor data to one or more of the models for further training of the models (step 612). In some embodiments, sensor data may only be used to further train the model(s) if the user associated with such sensor data is affirmatively or conclusively determined to have exhibited a particular behavior (e.g., clearly passed or clearly failed an authentication challenge issued by a reader or control point 412). This conclusive determination may be automated if the user is determined to have passed authentication whereas the conclusive determination may require a certain amount of manual input from security personnel if the user did not pass authentication (e.g., because there may be reasons that the user did not pass authentication other than the user is simply not an authorized or valid user).

Upon determining that the sensor data falls within the definition of at least one existing model, the method will continue with the pace/path authentication system 132 providing the sensor data to the models for the training of such models (step 612). The method further continues by determining whether or not the new sensor data changes any aspect of the model(s) (step 616). If not, then the old version(s) of the existing models are maintained without change (step 620). If the sensor data does change one or more models, then one or more parameters or coefficients of those model(s) may be updated (step 624). As shown in FIG. 7, this updating of model(s) in the model library 704 may include outputting one or more new model coefficients and/or changing the data cluster of a particular model.

Figure 8:
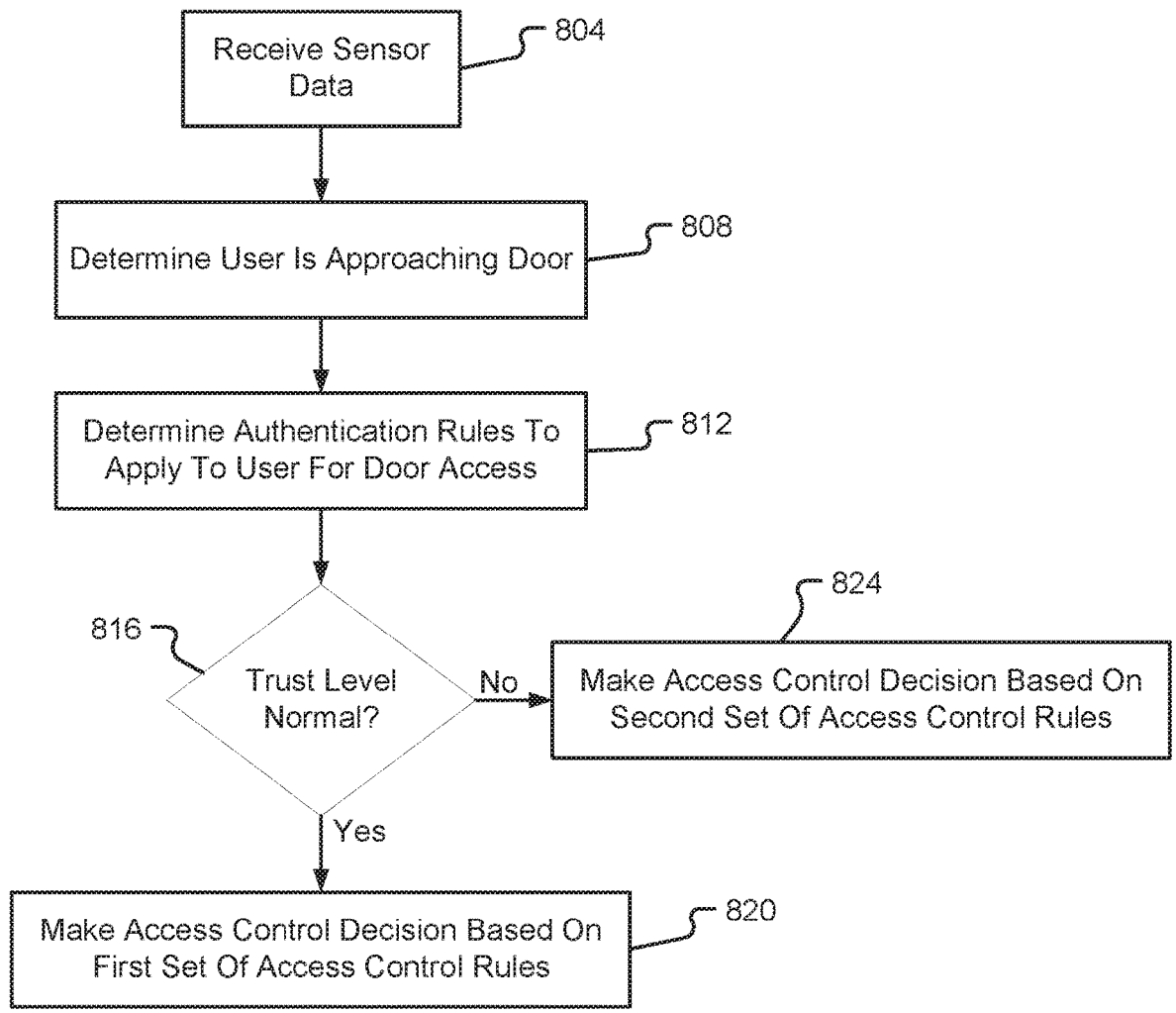
FIG. 8 is a flow chart illustrating another method of administering an access control system in accordance with embodiments of the present disclosure.

With reference now to FIG. 8, another method of administering or operating a physical access control system will be described in accordance with at least some embodiments of the present disclosure. The method begins by receiving sensor data at an appropriate analytics node in the access control system 100 (step 804). The method continues by determining that a user is approaching or has reached a door within the physical access control system (step 808). This determination may be made based on the sensor data received in step 804 or the determination may be made in response to detecting an attempted card/credential read at a particular reader 112/control point 412.

When the user is detected, the method continues by determining the authentication or validation rules that are to be applied to the user prior to granting the user door access (step 812). In some embodiments, the PACS security rules 328 may be referenced in addition to analyzing the pace/path analysis instructions 320 and/or zone-to-zone authentication rules 324. Based on an analysis of these rules (and with reference to the sensor data), the method continues by determining whether or not the trust level assigned to the user at the door is normal (step 816). If the trust level currently assigned to the user is normal (e.g., based on a comparison of the sensor data against the instructions 320, rules 324, or other models 708, 712, 716), then an access control decision may be made for the user based on a first set of access control rules (step 820). In some embodiments, a first set of PACS security rules 328 may be used to determine whether or not the user is allowed access to the physical asset protected by the door. This first set of access control rules may be less onerous as compared to another set of access control rules.

Accordingly, referring back to step 816, if the trust level assigned to the user is determined to be something other than normal, then the method may continue by making an access control decision for the user based on a second set of access control rules (step 824). In some embodiments, the second set of access control rules are more onerous than the first set of access control rules and, as such, may require the user to perform additional authentication steps (e.g., provide additional shared secrets, submit to additional biometric tests, etc.). The decision to allow the user access through the door in either step 820 or 824 will depend upon whether or not the rules are satisfied by the user's behavior or actions for the control point 412 and/or reader 112.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:
1. A method for administering a physical access control system, the method comprising:
receiving sensor data from one or more sensors deployed in a facility, the sensor data including information describing at least one of a user's activity within a particular zone of the facility or the user's movement between a plurality of zones of the facility;

comparing the sensor data to one or more user models that describe at least one of a normal or expected user activity within the particular zone of the facility or normal or expected user movement between the plurality of zones of the facility, wherein the normal or expected user activity within the particular zone of the facility comprises a predetermined number of steps a user is expected to take within the particular zone, and wherein the normal or expected user movement between the plurality of zones of the facility comprises a predetermined number of steps taken between the plurality of zones;

based on the comparison of the sensor data to the one or more user models, determining that the user's activity does not fall within at least one of the normal or expected user activity within the particular zone of the facility or the normal or expected user movement between the plurality of zones of the facility; and in response to determining that the user's activity does not fall within at least one of the normal or expected user activity within the particular zone of the facility or the normal or expected user movement between the plurality of zones of the facility, decreasing a trust level assigned to the user for the physical access control system.

2. The method of claim 1, further comprising in response to decreasing the trust level assigned to the user, increasing authentication requirements for the user to gain access to at least one secured asset.

3. The method of claim 2, wherein increasing the authentication requirements for the user comprises requiring the user to submit to multi-factor authentication that would not otherwise be required of the user if the trust level had not been decreased.

4. The method of claim 1, wherein at least one of the normal or expected user activity within the particular zone of the facility or the normal or expected user movement between the plurality of zones of the facility comprises at least one of (i) the user following a predetermined path within the facility within a programmable tolerance range and (ii) the user having a predetermined pace within a programmable tolerance range.

5. The method of claim 1, wherein at least one of the normal or expected user activity within the particular zone of the facility or the normal or expected user movement between the plurality of zones of the facility comprises a predetermined amount of time spent by the user within a given zone of the facility.

6. The method of claim 1, wherein the sensor data comprises a step count from an accelerometer held by the user.

7. The method of claim 1, wherein the sensor data comprises one or more images captured from an image capture device.

8. The method of claim 1, wherein the one or more user models comprise at least one of historical data specific to the user and historical data specific to a group of users.

9. An access control system, comprising:
a reading device associated with and configured to protect access to a physical asset for a plurality of users, and further configured to communicate with a user's portable device;
at least one sensor deployed in a position to obtain sensor data describing at least one of the user's activity within a particular zone of a facility or the user's movement between a plurality of zones of the facility, wherein the user's portable device comprises at least a first sensor of the at least one sensor;
access control rules, employed by the reading device, and that include a first set of access control rules and a second set of access control rules used to determine whether or not the user is allowed access to the physical asset, wherein the second set of access control rules is more onerous for the user as compared to the first set of access control rules; and
a pace/path authentication system that compares the sensor data to one or more user models that describe at least one of a normal or expected user activity within the particular zone of the facility or normal or expected user movement between the plurality of zones of the facility and, based on such an comparison, determines whether to subject the user to the first set of access control rules or the second set of access control rules.

10. The access control system of claim 9, wherein the pace/path authentication system is further configured to, in response to determining that the user's activity does not fall within at least one of the normal or expected user activity within the particular zone of the facility or the normal or expected user movement between the plurality of zones of the facility, decrease a trust level assigned to the user.

11. The access control system of claim 9, wherein the pace/path authentication system maintains a library of models that includes one or more of a pace authentication model, a path authentication model, or a combined pace/path authentication model.

12. The access control system of claim 11, wherein at least one model from the library of models is used as the one or more models that describe the normal or expected user activity within the particular zone of the facility or the normal or expected user movement between the plurality of zones of the facility.

13. The access control system of claim 12, wherein the models in the library of models are trained using the sensor data in the event that the user is granted access to the physical asset.

14. The access control system of claim 9, wherein the second set of access control rules require the user to submit to multi-factor authentication whereas the first set of access control rules do not require the user to submit to multi-factor authentication.

15. The access control system of claim 9, wherein the first set of access control rules enables the user to access the physical asset without performing any authentication with the reading device.

16. The access control system of claim 9, wherein at least one of the normal or expected user activity within the particular zone of the facility or the normal or expected user movement between the plurality of zones of the facility comprises at least one of (i) the user following a predetermined path within the facility within a programmable tolerance range and (ii) the user having a predetermined pace within a programmable tolerance range.

17. The access control system of claim 15, wherein the second set of access control rules requires the user to perform authentication with the reading device in order to access the physical asset.

18. A non-transitory computer readable medium comprising processor-executable instructions that, when executed by a processor, enable the execution of a method that comprises:
receiving sensor data from one or more sensors deployed in a facility, the sensor data including information describing at least one of a user's activity within a particular zone of the facility or the user's movement between a plurality of zones of the facility;

comparing the sensor data to one or more user models that describe at least one of a normal or expected user activity within the particular zone of the facility or normal or expected user movement between the plurality of zones of the facility, wherein the one or more user models that describe the normal or expected user activity within the particular zone or the normal or expected user movement between the plurality of zones comprises at least one of a model describing historical pace behaviors for a group of a plurality of users and a model describing historical path behaviors for a group of a plurality of users;

based on the comparison of the sensor data to the one or more user models, determining that the user's activity does not fall within at least one of the normal or expected user activity within the particular zone of the facility or the normal or expected user movement between the plurality of zones of the facility; and in response to determining that the user's activity does not fall within at least one of the normal or expected user activity within the particular zone of the facility or the normal or expected user movement between the plurality of zones of the facility, decreasing a trust level assigned to the user for the physical access control system.

19. The non-transitory computer readable medium of claim 18, wherein the one or more user models that describe the normal or expected user activity within the particular zone or the normal or expected user movement between the plurality of zones further comprises at least one of a model describing historical pace behaviors for the user and a model describing historical path behaviors for the user.

* * * * *